(12) United States Patent
Yokoyama et al.

(10) Patent No.: US 12,360,394 B2
(45) Date of Patent: Jul. 15, 2025

(54) METHOD FOR MANUFACTURING OPTICAL MEMBER AND OPTICAL MEMBER

(71) Applicant: HOYA LENS THAILAND LTD., Pathumthani (TH)

(72) Inventors: Shinichi Yokoyama, Tokyo (JP); Shigeki Ookubo, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 901 days.

(21) Appl. No.: 17/418,432

(22) PCT Filed: Dec. 25, 2019

(86) PCT No.: PCT/JP2019/050745
§ 371 (c)(1),
(2) Date: Jun. 25, 2021

(87) PCT Pub. No.: WO2020/138134
PCT Pub. Date: Jul. 2, 2020

(65) Prior Publication Data
US 2021/0397020 A1    Dec. 23, 2021

(30) Foreign Application Priority Data

Dec. 28, 2018    (JP) ................................ 2018-246477
Dec. 28, 2018    (JP) ................................ 2018-246478

(51) Int. Cl.
*G02C 7/02*       (2006.01)
*B23K 26/36*     (2014.01)
(Continued)

(52) U.S. Cl.
CPC ................ *G02C 7/02* (2013.01); *B23K 26/36* (2013.01); *B23K 26/364* (2015.10); *B29D 11/00009* (2013.01); *B29D 11/00865* (2013.01)

(58) Field of Classification Search
None
See application file for complete search history.

(56) References Cited

U.S. PATENT DOCUMENTS 9,952,448 B2 *   4/2018   Crespo ............. B29D 11/00442
2014/0004639 A1   1/2014   Sato
(Continued)

FOREIGN PATENT DOCUMENTS

EP    3 293 565 A1    3/2018
JP    2008-30091 A    2/2008
(Continued)

OTHER PUBLICATIONS

Morisono JP2008030091 2008 English Translation (Year: 2008).*
(Continued)

*Primary Examiner* — Jacob T Minskey
*Assistant Examiner* — Adrien J Bernard
(74) *Attorney, Agent, or Firm* — Oliff PLC

(57) ABSTRACT

A film forming step of forming a thin film on an optical surface of an optical substrate, the optical surface having a curved surface shape, and a removal step of partially removing the thin film on the optical surface to perform patterning of the thin film. In the removal step, the thin film is removed by being irradiated with a laser beam.

15 Claims, 5 Drawing Sheets

(51) Int. Cl.
 *B23K 26/364* (2014.01)
 *B29D 11/00* (2006.01)

(56) References Cited

U.S. PATENT DOCUMENTS

| | | |
|---|---|---|
| 2018/0292754 A1 | 10/2018 | Kikuchi et al. |
| 2019/0171034 A1 | 6/2019 | Maurice et al. |
| 2019/0258836 A1 | 8/2019 | Maurice et al. |

FOREIGN PATENT DOCUMENTS

| | | |
|---|---|---|
| JP | 4827393 B2 | 11/2011 |
| JP | 2014-46330 A | 3/2014 |
| JP | 2015-74400 A | 4/2015 |
| JP | 2016-007612 A | 1/2016 |
| JP | 2018-180168 A | 11/2018 |
| WO | 2018/015650 A1 | 1/2018 |

OTHER PUBLICATIONS

Maurice WO2018015650 2018 English Translation (Year: 2018).*
Jul. 14, 2022 Extended Search Report issued in European Patent Application No. 19904988.3.
Mar. 10, 2020 International Search Report issued in International patent Application No. PCT/JP2019/050745.
Jun. 16, 2021 International Preliminary Report on Patentability issued in International Patent Application No. PCT/JP2019/050745.

\* cited by examiner

METHOD FOR MANUFACTURING OPTICAL MEMBER AND OPTICAL MEMBER

TECHNICAL FIELD

The present invention relates to a method for manufacturing an optical member, and an optical member.

BACKGROUND ART

In recent years, there are spectacle lenses in which patterning of a predetermined pattern is performed on a thin film (SnO2 film, Cr film, etc.) on an optical surface of a lens substrate. Patterning for forming the predetermined pattern is performed by, for example, forming a resist pattern on the optical surface using an inkjet recording method, forming the thin film on the resist pattern, and then partially separating the thin film by removing the resist pattern (see Patent Document 1, for example).

CITATION LIST

Patent Documents

Patent Document 1: JP 2018-180168A

SUMMARY OF INVENTION

Technical Problem

In spectacle lenses, the optical surface is curved, and therefore the resist pattern needs to be formed on the curved surface in the patterning of the thin film. If the resist pattern is formed using the inkjet recording method, there is a risk of the resist pattern being not accurately formed on the optical surface due to variation occurring in impact of the resist on the optical surface, resulting in a failure to perform the patterning with high accuracy. Also, processing steps for the patterning may be troublesome because the resist pattern needs to be formed and removed, for example.

An object of the present invention is to provide a technology that makes it possible to perform patterning with high accuracy even when the patterning is performed on a thin film on a curved optical surface of an optical member, and to keep processing steps for the patterning from becoming troublesome.

Solution to Problem

The present invention was devised to achieve the above-described object.

A first aspect of the present invention is a method for manufacturing an optical member, including:
a film forming step of forming a thin film on an optical surface of an optical substrate, the optical surface having a curved surface shape; and
a removal step of partially removing the thin film on the optical surface to perform patterning of the thin film, wherein
in the removal step, the thin film is removed by being irradiated with a laser beam.

A second aspect of the present invention is the method for manufacturing an optical member according to the first aspect, wherein
in the removal step, the laser beam is emitted using a laser processing machine that supports three-dimensional control of a focal position of the laser beam.

A third aspect of the present invention is the method for manufacturing an optical member according to the first or the second aspect, wherein
a laser beam that has a wavelength that belongs to a wavelength band where a difference between a transmittance of the optical substrate and a transmittance of the thin film is 1% or more is used as the laser beam emitted in the removal step.

A fourth aspect of the present invention is the method for manufacturing an optical member according to the third aspect, further including:
a non-removal film forming step of forming, as a non-removal film, a film made of a material that is different from the thin film between the optical substrate and the thin film, wherein
the wavelength of the laser beam emitted in the removal step belongs to a wavelength band where there is a difference of 1% or more between the transmittance of the thin film and a transmittance of the non-removal film, as well as between the transmittance of the thin film and the transmittance of the optical substrate.

A fifth aspect of the present invention is the method for manufacturing an optical member according to any one of the first to fourth aspects, wherein
the optical member is a spectacle lens.

A sixth aspect of the present invention is the method for manufacturing an optical member according to any one of the first to fifth aspects, wherein
the thin film is a metal oxide film or a metal film that has an absorption property.

A seventh aspect of the present invention is the method for manufacturing an optical member according to any one of the first to sixth aspects, wherein
a pattern portion that is formed through the patterning in the removal step is constituted by a plurality of identically-shaped portions that are arranged on the optical surface, and a dimensional variation of each of the identically-shaped portions is no greater than ±10%.

An eighth aspect of the present invention is an optical member including:
an optical substrate that has an optical surface having a curved surface shape;
a thin film that is formed on the optical surface of the optical substrate; and
a pattern portion that is formed by partially removing the thin film, wherein
the pattern portion is constituted by a plurality of identically-shaped portions that are arranged on the optical surface.

A ninth aspect of the present invention is the optical member according to the eighth aspect, wherein
in the pattern portion, a dimensional variation of each of the plurality of identically-shaped portions is no greater than ±10%.

A tenth aspect of the present invention is the optical member according to the ninth aspect, wherein
in the pattern portion, a dimensional variation between an identically-shaped portion that is arranged near the center of the optical surface and an identically-shaped portion that is arranged near the peripheral edge of the optical surface is no greater than ±10%.

An eleventh aspect of the present invention is the optical member according to any one of the eighth to tenth aspects, wherein
the pattern portion constitutes a dotted pattern, and
the identically-shaped portions constitute dots of the dotted pattern.

A twelfth aspect of the present invention is the optical member according to any one of the eighth to eleventh aspects, wherein
the pattern portion has a laser processing mark in an underlying surface that is exposed as a result of the thin film being removed.

A thirteenth aspect of the present invention is the optical member according to any one of the eighth to twelfth aspects, wherein
the optical member is a spectacle lens.

A fourteenth aspect of the present invention is the optical member according to any one of the eighth to thirteenth aspects, wherein
the thin film is a metal oxide film or a metal film that has an absorption property.

Advantageous Effects of Invention

According to the present invention, patterning can be performed with high accuracy even when the patterning is performed on a thin film on a curved optical surface of an optical member, and processing steps for the patterning can be kept from becoming troublesome.

BRIEF DESCRIPTION OF DRAWINGS

FIG. 4(a) is a diagram showing the relationships with respect to a first lens substrate having a refractive index of 1.50, FIG. 4(b) is a diagram showing the relationships with respect to a second lens substrate having a refractive index of 1.60, and FIG. 4(c) is a diagram showing the relationships with respect to a third lens substrate having a refractive index of 1.67.

FIG. 5(a) is a diagram showing results of microscopy observation of the pattern portion according to the present embodiment, and FIG. 5(b) is a diagram showing results of microscopy observation of a pattern portion of a comparative example obtained using the inkjet recording method.

DESCRIPTION OF EMBODIMENTS

The following describes an embodiment of the present invention based on the drawings.

(1) Schematic Configuration of Spectacle Lens

First, a schematic configuration of a spectacle lens, which will be described as an example in the present embodiment, will be described.

Figure 1:
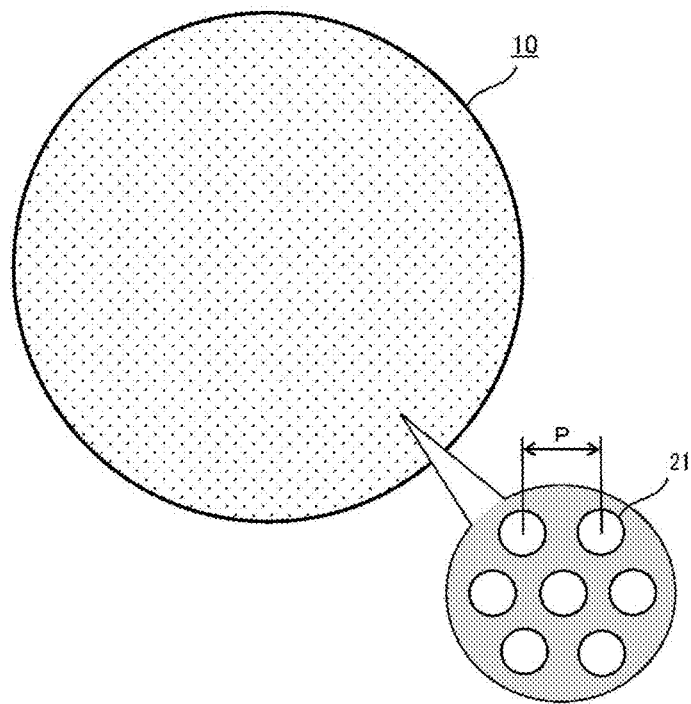
FIG. 1 is a plan view showing an example configuration of a spectacle lens according to an embodiment of the present invention.
Figure 2:
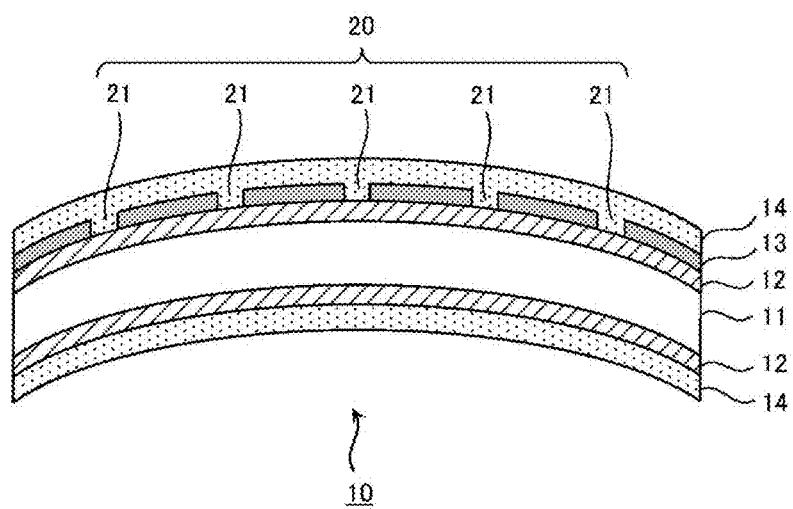
FIG. 2 is a cross-sectional view showing an example configuration of the spectacle lens according to an embodiment of the present invention.

FIG. 1 is a plan view showing an example configuration of the spectacle lens described as an example in the present embodiment, and FIG. 2 is a cross-sectional view of the spectacle lens.

Overall Configuration

A spectacle lens 10 includes an object-side surface and an eye-side surface as optical surfaces. The "object-side surface" is the surface that is located on the object side when spectacles provided with the spectacle lens 10 are worn by a wearer. The "eye-side surface" is the surface located on the opposite side, that is, the eye side when the spectacles provided with the spectacle lens 10 are worn by the wearer. Commonly, the object-side surface is a convex surface and the eye-side surface is a concave surface, that is, the spectacle lens 10 is commonly a meniscus lens.

As shown in FIG. 1, in the spectacle lens 10 according to the present embodiment, a plurality of minute dots 21 are arranged in an isotropically uniform manner on at least one of the object-side surface and the eye-side surface, and a predetermined pattern is formed by the dots 21. In the present embodiment, an example in which the predetermined pattern is formed over the entire surface of the spectacle lens 10 is shown, but the predetermined pattern may be formed in a portion of the spectacle lens 10. Also, the predetermined pattern may be constituted by a character, a figure, or the like, rather than the plurality of minute dots 21.

The plurality of dots 21 constituting the predetermined pattern are formed so as to have the same shape (e.g., a circular shape). These dots 21 being "arranged in an isotropically uniform manner" means that the dots 21 are arranged such that the pitch P between adjacent dots 21 is constant.

As shown in FIG. 2, the spectacle lens 10 having the predetermined pattern includes a lens substrate 11, which is an optical substrate, hard coat films (HC films) 12 that are respectively formed on the opposite sides (i.e., the object-side surface and the eye-side surface) of the lens substrate 11, a patterning thin film 13 that is formed on the HC film 12 on one surface (specifically, the object-side surface) side, and anti-reflection films (AR films) 14 that are formed on both sides. Here, an example in which the patterning thin film 13 is arranged on the object-side surface is described, but the present invention is not limited to this, and the patterning thin film 13 only needs to be formed on at least one surface. Also, the spectacle lens 10 may further include another film in addition to the HC films 12, the patterning thin film 13, and the AR films 14.

Lens Substrate

The lens substrate 11 is made of a common resin material that is used for optical lenses, and is molded into a predetermined lens shape. That is, the lens substrate 11 includes optical surfaces for constituting the predetermined lens shape, as the object-side surface and the eye-side surface. The predetermined lens shape may be any of a shape that constitutes a single focus lens, a shape that constitutes a multifocal lens, a shape that constitutes a progressive power lens, and the like. In any of the lens shapes, at least one (usually both) of the optical surfaces of the lens substrate 11 has a curved surface shape.

As the resin material that constitutes the lens substrate 11, a resin material that has a refractive index (nD) of about 1.50 to 1.74 is used, for example. Examples of such a resin material include allyl diglycol carbonate, urethane-based resin, polycarbonates, thiourethane-based resin, and episulfide resin. Note that the lens substrate 11 may be constituted by a resin material with which desired refraction can be achieved, other than those listed above, or may also be constituted by inorganic glass.

HC Film

Each HC film 12 is formed so as to have a thickness of about 3 μm to 4 μm using a curable material that contains a silicon compound, for example. The refractive index (nD) of the HC films 12 is close to the refractive index of the above-described material of the lens substrate 11, and is about 1.49 to 1.74, for example, and the film configuration is selected according to the material of the lens substrate 11. Durability of the spectacle lens 10 can be improved by coating the spectacle lens 10 with the HC films 12.

Patterning Thin Film

The patterning thin film 13 is formed on the optical surface of the lens substrate 11 with the HC film 12 interposed therebetween, and is constituted by a thin film that has a thickness of several nanometers to several tens of nanometers, for example. As the material that constitutes the patterning thin film 13, a metal or a metal oxide that has a property of absorbing a laser beam, which will be described later, is used, for example. That is, the patterning thin film 13 is a metal oxide film or a metal film that has an absorption property. Examples of such films include films that contain at least one metal selected from chromium (Cr), tantalum (Ta), niobium (Nb), titanium (Ti), zirconium (Zr), gold (Au), silver (Ag), tin (Sn), and aluminum (Al) or a metal oxide, and the patterning thin film 13 is preferably a tin dioxide ($SnO_2$) film or a Cr film. The following mainly describes a case where the patterning thin film 13 is a $SnO_2$ film or a Cr film.

The patterning thin film 13 includes a pattern portion 20 in which the thin film is partially removed. The pattern portion 20 constitutes the predetermined pattern described above. More specifically, a plurality of identically-shaped portions 21 are arranged to constitute the pattern portion 20. The identically-shaped portions 21 are formed by partially removing the thin film and correspond to the dots 21 described above.

That is, in the present embodiment, the pattern portion 20 constitutes a dotted pattern that is the predetermined pattern, and the identically-shaped portions 21 constitute the dots 21 of the dotted pattern.

AR Film

The AR films 14 have a multilayer structure in which films having different refractive indexes are layered, and prevent reflection of light by interference. However, the AR films 14 do not necessarily need to have the multilayer structure, and may also have a single-layer structure so long as the effect of preventing reflection of light can be achieved.

In a case where the AR films 14 have a multilayer structure that includes a low refractive index layer and a high refractive index layer, the low refractive index film is made of silicon dioxide ($SiO_2$) that has a refractive index of about 1.43 to 1.47, for example. The high refractive index film is made of a material that has a higher refractive index than the low refractive index film, and is formed using metal oxides such as niobium oxide ($Nb_2O_5$), tantalum oxide ($Ta_2O_5$), titanium oxide ($TiO_2$), zirconium oxide ($ZrO_2$), yttrium oxide ($Y_2O_3$), and aluminum oxide ($Al_2O_3$) at an appropriate ratio.

Visibility of an image through the spectacle lens 10 can be improved by coating the spectacle lens 10 with the AR films 14.

(2) Method for Manufacturing Spectacle Lens

Next, the following specifically describes an example procedure for manufacturing the spectacle lens 10 configured as described above, i.e., an example procedure of a method for manufacturing a spectacle lens according to the present embodiment.

Figure 3:
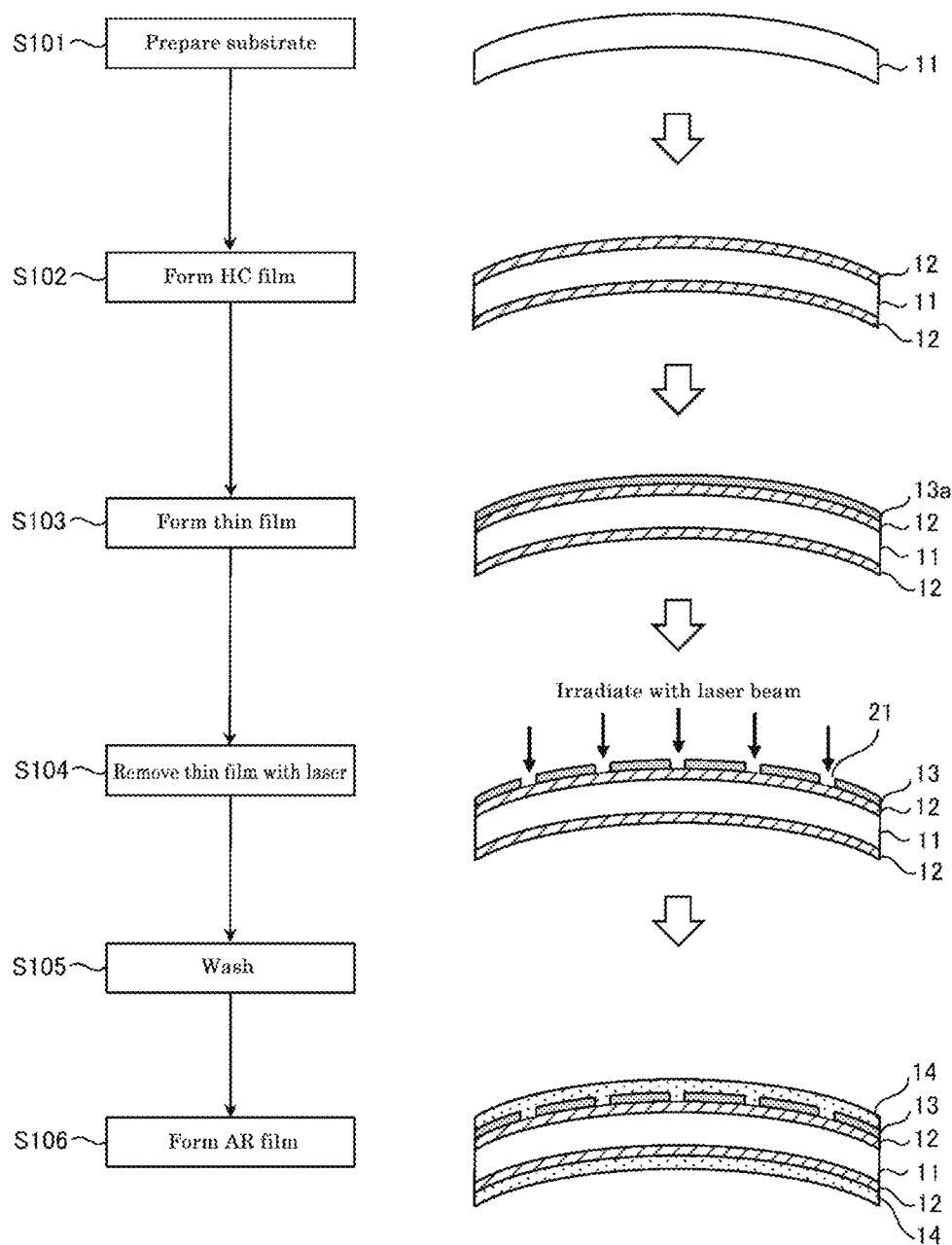
FIG. 3 is a flow diagram showing an example procedure of a method for manufacturing a spectacle lens according to an embodiment of the present invention.

FIG. 3 is a flow diagram showing the example procedure of the manufacturing method according to the present embodiment.

Outline of Basic Procedure

In the manufacture of the spectacle lens 10, first, the lens substrate 11, which is an optical substrate, is prepared in a first step (step 101, hereinafter "step" will be abbreviated as "S").

After the lens substrate 11 is prepared, next, a step of forming the HC films 12 on both sides of the lens substrate 11 is performed as a second step (S102). The HC films 12 can be formed by using a dipping method using a solution in which a curable material containing a silicon compound is dissolved, for example. The formed HC films 12 are not removed in steps described below. Accordingly, the step of forming the HC films 12 corresponds to a "non-removal film forming step" of forming, as a non-removal film, a film made of a material that is different from the patterning thin film 13 between the lens substrate 11 and the patterning thin film 13, which is formed in the following step.

After the HC films 12 are formed, next, a step of forming a $SnO_2$ film or a Cr film as a thin film 13a, from which the patterning thin film 13 is to be formed, on the optical surface of the lens substrate 11 via the HC film 12 is performed as a third step (S103). More specifically, the $SnO_2$ film or the Cr film is formed as the thin film 13a on the HC film 12 formed on the convex surface, which is the object-side surface. The thin film 13a can be formed through vacuum deposition or sputtering, for example. This step corresponds to a "film forming step" of forming the thin film 13a on the curved optical surface.

After the thin film 13a is formed, next, a step of partially removing the thin film 13a to form the pattern portion 20 is performed as a fourth step (S104). This step corresponds to a "removal step" of partially removing the thin film 13a to perform patterning of the thin film 13a. In the present embodiment, the patterning of the thin film 13a is performed through laser beam irradiation, which will be described later in detail. When the patterning of the thin film 13a is performed, the patterning thin film 13 including the pattern portion 20 is formed on the HC film 12 on the convex surface side.

After the patterning thin film 13 is formed, a washing step is performed as a fifth step to remove a residue of the patterning and adhering matter (foreign matter) (S105).

Thereafter, a step of forming the AR films 14 on the convex surface, which is the object-side surface, and the concave surface, which is the eye-side surface, is performed as a sixth step (S106). In a case where the AR films 14 have a multilayer structure, a low refractive index layer and a high refractive index layer are alternately layered in this order from the lower layer side. The AR films 14 can be formed through ion assisted deposition, for example.

Details of Removal Step

Here, the removal step performed as the fourth step (S104) will be described more specifically.

As described above, it is known to perform patterning for forming a predetermined pattern by forming a resist pattern on an optical surface using the inkjet recording method and using the resist pattern. However, the optical surface of the spectacle lens 10 has the curved surface shape, and accordingly, if the resist pattern is formed using the inkjet recording method, there is a risk of the resist pattern being not accurately formed on the optical surface, resulting in a failure to perform the patterning with high accuracy. Therefore, in the present embodiment, the patterning for forming the predetermined pattern (i.e., the pattern portion 20) is performed through laser processing using laser beam irradiation.

More specifically, in the removal step (S104) of the present embodiment, only portions of the thin film 13a that are to be removed are selectively irradiated with a laser beam to partially remove the thin film 13a using the energy of the laser beam and form the pattern portion 20.

Three-Dimensional Control of Laser Beam Focal Position

At this time, the laser beam is emitted using a laser processing machine that supports three-dimensional control of the focal position of the laser beam.

The laser processing machine that is used includes a laser oscillator that causes oscillation of the laser beam, a laser optical system that condenses the laser beam emitted from the laser oscillator and emits the laser beam, and a table portion to which an irradiation subject (in the present embodiment, the lens substrate on which the thin film has been formed) that is to be irradiated with the laser beam is fixed. It is also possible to use a laser processing machine in which the laser oscillator and the laser optical system are integrated to constitute a laser head. The laser processing machine configured as described above "supporting three-dimensional control of the focal position of the laser beam" means that the laser processing machine is capable of changing the focal position of the laser beam emitted toward an irradiation subject not only in an XY direction extending along the surface of the table portion but also in a Z direction extending along the optical axis of the laser beam, and is also capable of controlling the manner of change of the focal position through at least one of movement of positions of the laser optical system and the table portion relative to each other and adjustment of an optical path through the laser optical system.

More specifically, the three-dimensional control of the focal position of the laser beam is performed as described below. First, pattern data regarding the pattern portion 20 that is to be formed and surface data regarding a pattern formation surface of the lens substrate 11 on which the pattern portion 20 is to be formed are acquired. Then, the focal position of the laser beam is changed in the XY direction so as to follow the acquired pattern data and is also changed in the Z direction so as to follow the acquired surface data. Such three-dimensional control of the focal position of the laser beam can be performed using a computer device for control that is connected to the laser processing machine.

If such three-dimensional control of the focal position of the laser beam is supported, it is possible to perform patterning with high accuracy even when the patterning is performed on the thin film 13a on the curved optical surface. Furthermore, the patterning can be directly performed on the thin film 13a using the laser beam, and therefore, formation and removable of a resist pattern and the like can be omitted.

Wavelength of Laser Beam

Incidentally, the laser beam that is emitted in the removal step (S104) is for partially removing the thin film 13a, and it is desirable that the laser beam does not cause damage or the like in the lens substrate 11 and the HC films 12 other than the thin film 13a. Therefore, in the present embodiment, a laser beam that has a wavelength described below is used in the laser beam irradiation in the removal step (S104).

Figure 4:
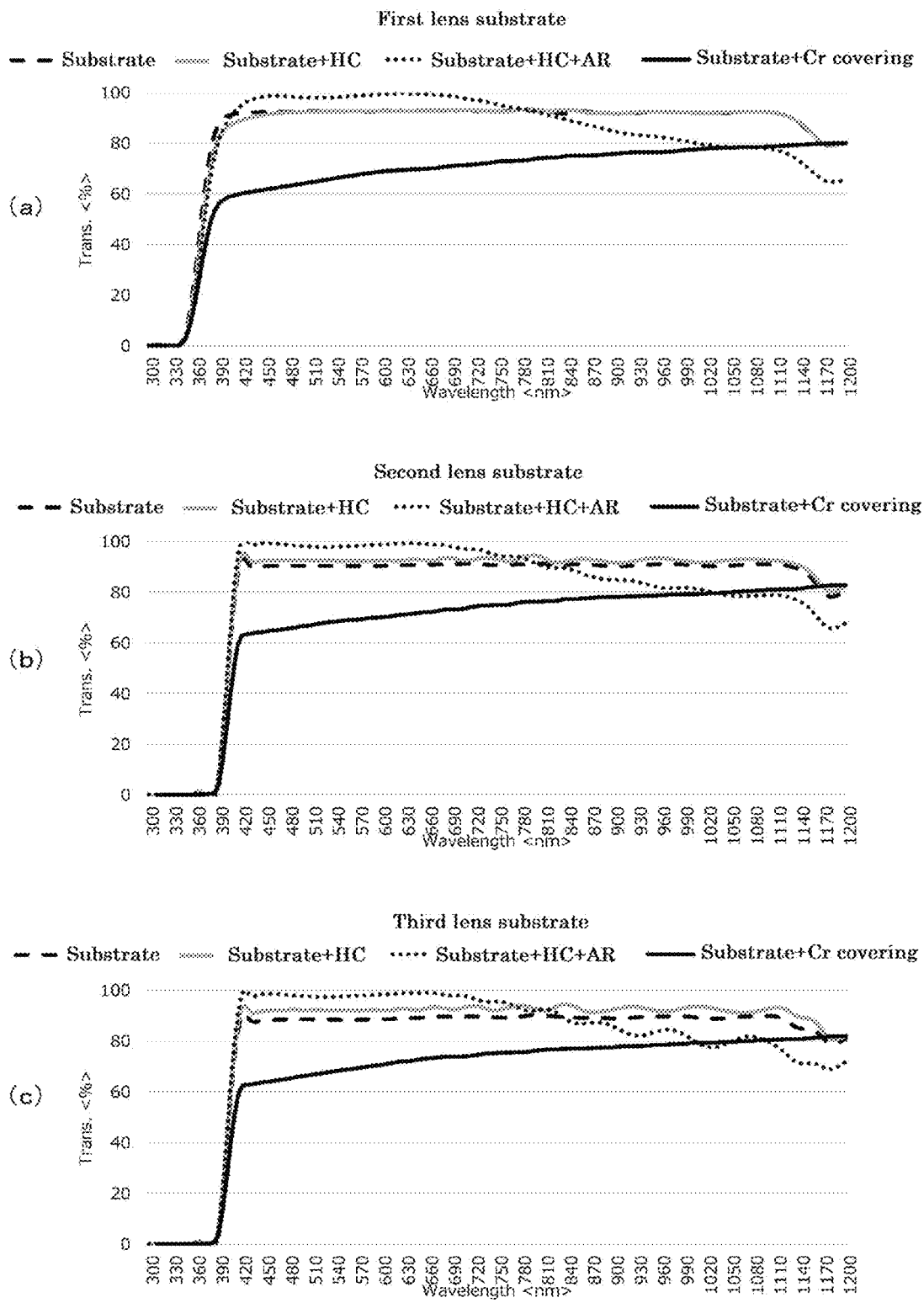
FIG. 4 is an illustrative diagram showing relationships between the wavelength of a laser beam and the transmittance for respective constitutional members of a spectacle lens.

FIG. 4 is an illustrative diagram showing relationships between the wavelength of a laser beam and transmittances of constitutional members of the spectacle lens. FIG. 4(a) shows a specific example of a change in the transmittance when the wavelength of a laser beam was changed, for each of the lens substrate 11 alone (see the black dashed line in the drawing), the lens substrate 11+the HC film 12 (see the gray solid line in the drawing), the lens substrate 11+the HC film 12+the AR film 14 (see the black dotted line in the drawing), and the lens substrate 11+the thin film 13a (see the black solid line in the drawing), in a case where the lens substrate (first lens substrate) 11 having a refractive index of 1.50 was used. Also, FIG. 4(b) shows a specific example of a change in the transmittance when the wavelength of a laser beam was changed, for each of the lens substrate 11 alone (see the black dashed line in the drawing), the lens substrate 11+the HC film 12 (see the gray solid line in the drawing), the lens substrate 11+the HC film 12+the AR film 14 (see the black dotted line in the drawing), and the lens substrate 11+the thin film 13a (see the black solid line in the drawing), in a case where the lens substrate (second lens substrate) 11 having a refractive index of 1.60 was used. Also, FIG. 4(c) shows a specific example of a change in the transmittance when the wavelength of a laser beam was changed, for each of the lens substrate 11 alone (see the black dashed line in the drawing), the lens substrate 11+the HC film 12 (see the gray solid line in the drawing), the lens substrate 11+the HC film 12+the AR film 14 (see the black dotted line in the drawing), and the lens substrate 11+the thin film 13a (see the black solid line in the drawing), in a case where the lens substrate (third lens substrate) 11 having a refractive index of 1.67 was used.

It can be found from FIGS. 4(a) to 4(c) that, in all of the cases, there is a tendency that the transmittance sharply increases from the ultraviolet wavelength range to the visible wavelength range of the laser beam, and there is a large difference between the transmittance of the lens substrate 11+the thin film 13a and the transmittance of the lens substrate 11 alone or the lens substrate 11+the HC film 12 in the visible wavelength range (e.g., 380 nm to 780 nm) and a portion (e.g., 780 nm to 1150 nm) of the near infrared wavelength range, but the difference decreases as the wavelength exceeds that wavelength range.

If the transmittance of a member is large, even when the member is irradiated with the laser beam, energy of the laser beam is unlikely to be absorbed by the member (i.e., the laser beam is likely to pass through the member), and therefore, the member can be kept from being damaged. On the other hand, if the transmittance is small, an absorption rate of the energy of the emitted laser beam increases, and therefore, it is possible to efficiently perform processing (e.g., partial removal of the member) or the like using absorption of the energy. Accordingly, if there is a large difference in transmittance between members that are layered on each other, processing or the like can be performed only on some of the members using the laser beam.

Based on this, in the present embodiment, a laser beam that has a wavelength that belongs to a wavelength band where the difference between the transmittance of the lens substrate 11 and the transmittance of the thin film 13a is 1% or more, preferably 3% or more, more preferably 5% or more, and further preferably 10% or more is used as the laser beam emitted in the removal step (S104). Furthermore, the wavelength of the laser beam that is used belongs to a wavelength band where there is a difference of 1% or more, preferably 3% or more, more preferably 5% or more, and further preferably 10% or more between the transmittance of the thin film 13a and the transmittance of the HC film 12, which is a non-removal film, as well as between the transmittance of the thin film 13a and the transmittance of the lens substrate 11. It is also possible to use a laser beam having a wavelength that belongs to a wavelength band where there is a difference of 1% or more, preferably 3% or more, more preferably 5% or more, and further preferably 10% or more between the transmittance of the thin film 13*a* and the transmittance of the AR film 14, which is another non-removal film. Note that the transmittances of the lens substrate 11, the HC film 12, and the AR film 14 referred to here can include transmittances of laminates of these members.

A wavelength band where the difference in transmittance is 5% or more (i.e., more preferable difference in transmittance) is from 380 nm to 1150 nm, for example, in the specific examples shown in FIGS. 4(*a*) to 4(*c*). In the removal step (S104), a laser beam that has a wavelength of 1064 nm is emitted as a laser beam having a wavelength that belongs to this wavelength band, for example. This is because, if the wavelength of the laser beam is 1064 nm, the difference in transmittance is 10% or more, the transmittances of the lens substrate 11 and the HC film 12 are 90% or more, and influence of the laser beam on the lens substrate 11 can be suppressed.

As described above, if the difference in transmittance is at least 1%, when laser beam irradiation is performed, the laser beam passes through (does not damage) the lens substrate 11, the HC film 12, and the like, and only irradiated portions of the thin film 13*a* can be removed due to its high absorption rate. That is, it is possible to directly perform patterning on the thin film 13*a* through laser beam irradiation. Also, it is possible to reliably perform the direct patterning through laser beam irradiation if the difference in transmittance is set to be preferably 3% or more, more preferably 5% or more, and further preferably 10% or more.

Note that an upper limit of the difference in transmittance is about 50% because all of the lens substrate 11, the HC film 12, the thin film 13*a*, and the like have optical transparency.

Predetermined Pattern

Here, the pattern portion 20 formed through the patterning in the removal step (S104) will be described using a specific example.

As described above, the pattern portion 20 is formed through laser processing, and the laser processing is performed with the three-dimensional control of the focal position of the laser beam. Therefore, the pattern portion 20 is formed with high accuracy, specifically an accuracy described below.

Figure 5:
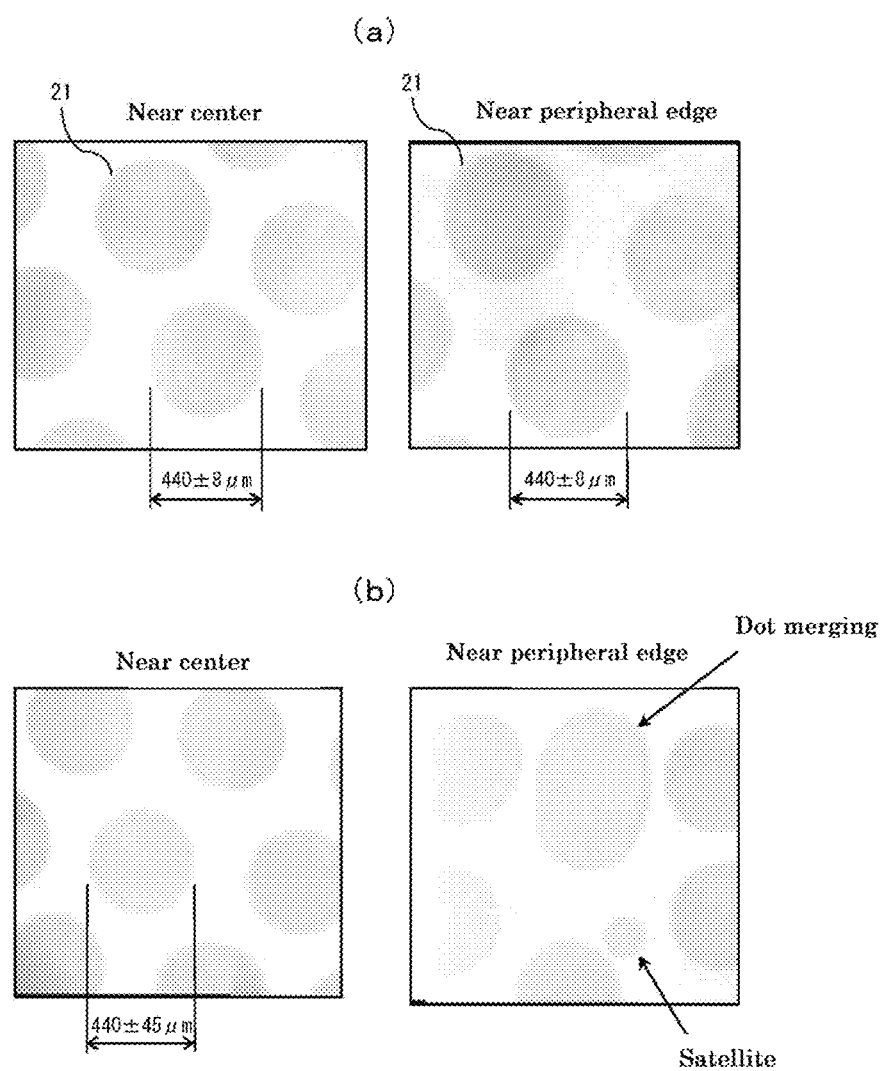
FIG. 5 shows partial enlarged views of a specific example of a pattern portion of a spectacle lens according to an embodiment of the present invention.

FIG. 5 shows partial enlarged views of a specific example of the pattern portion of the spectacle lens according to the present embodiment. Note that in the illustrated example, the pattern portion 20 is a dotted pattern that is constituted by a plurality of dots (identically-shaped portions) 21, and a result of microscopy observation of a portion of the dotted pattern near the center of the optical surface of the spectacle lens 10 and a result of microscopy observation of a portion of the dotted pattern near the peripheral edge of the optical surface are shown side by side. FIG. 5(*a*) shows an example of the dotted pattern obtained through laser processing according to the present embodiment, and FIG. 5(*b*) shows an example of a dotted pattern of a comparative example obtained using the inkjet recording method.

As shown in FIG. 5(*a*), the pattern portion 20 according to the present embodiment, which is the dotted pattern, is constituted by the dots (identically-shaped portions) 21 arranged on the optical surface, and a dimensional variation of each of the dots 21 is no greater than ±10%, preferably no greater than 6%, and more preferably no greater than 2%.

Also, when a dot 21 that constitutes the portion of the dotted pattern near the center of the optical surface of the spectacle lens 10 is compared with a dot 21 that constitutes the portion of the dotted pattern near the peripheral edge of the optical surface, the dimensional variation of each of the dots is no greater than ±10%, preferably no greater than 6%, and more preferably no greater than 2%.

The "dimensional variation" referred to here means at least one of (1) a variation in diameter among dots 21 each having a substantially perfect circular shape in a plan view, and (2) a variation in the longitudinal diameter and the lateral diameter (aspect ratio) of each dot 21, and preferably means both of (1) and (2). More specifically, as for (1), the dimensional variation in diameter among dots 21 is, for example, within the range of 440±44 μm, preferably within the range of 440±26 μm, and more preferably within the range of 440±8 μm in both of the portion near the center of the optical surface and the portion near the peripheral edge of the optical surface. As for (2), the variation in aspect ratio of each dot 21 is, for example, within the range of 440±44 μm, preferably within the range of 440±26 μm, and more preferably within the range of 440±8 μm.

On the other hand, in the dotted pattern shown in FIG. 5(*b*), which was obtained using the inkjet recording method, the dimensional variation of dots exceeds ±10%, specifically, exceeds the range of 440±44 μm. In particular, in the vicinity of the peripheral edge of the optical surface, there is a risk of dots merging with each other due to a difference in the time of impact of the ink on the optical surface and there is also a risk of satellites (small dots) like splashes being formed around original dots, and the variation in aspect ratio tends to be large.

That is, in the case where the optical surface has the curved surface shape, if the inkjet recording method is used, for example, a dimensional variation that exceeds about ±10% and deformation of dots (variation in aspect ratio) may occur. In contrast, if patterning is performed by performing laser beam irradiation while performing the three-dimensional control of the focal position as described in the present embodiment, the dimensional variation of the formed pattern portion 20 can be reduced so as to be no greater than ±10%, preferably no greater than 6%, and more preferably no greater than 2%. In particular, the variation in aspect ratio described above in (2) can be greatly improved when compared to the case where the inkjet recording method is used. Therefore, even when the dotted pattern is formed by arranging the plurality of dots 21 on the curved optical surface, the dotted pattern can be formed with extremely high accuracy, and consequently stable quality of the spectacle lens 10 can be achieved.

In particular, in the case where the optical surface has the curved surface shape, it is highly likely that the largest dimensional variation occurs between the portion near the center of the optical surface and the portion near the peripheral edge of the optical surface, but if patterning is performed by performing laser beam irradiation while performing the three-dimensional control of the focal position as described in the present embodiment, the largest dimensional variation can be reduced to be no greater than ±2%. Therefore, even if the dotted pattern is arranged over the entire optical surface having the curved surface shape, for example, the dotted pattern can be formed with extremely high accuracy, and consequently stable quality of the spectacle lens 10 can be achieved.

The pattern portion 20 is formed through laser processing, and therefore has laser processing marks that can be observed using a laser microscope in an underlying surface that is exposed as a result of the thin film 13a being removed.

Figure 6:
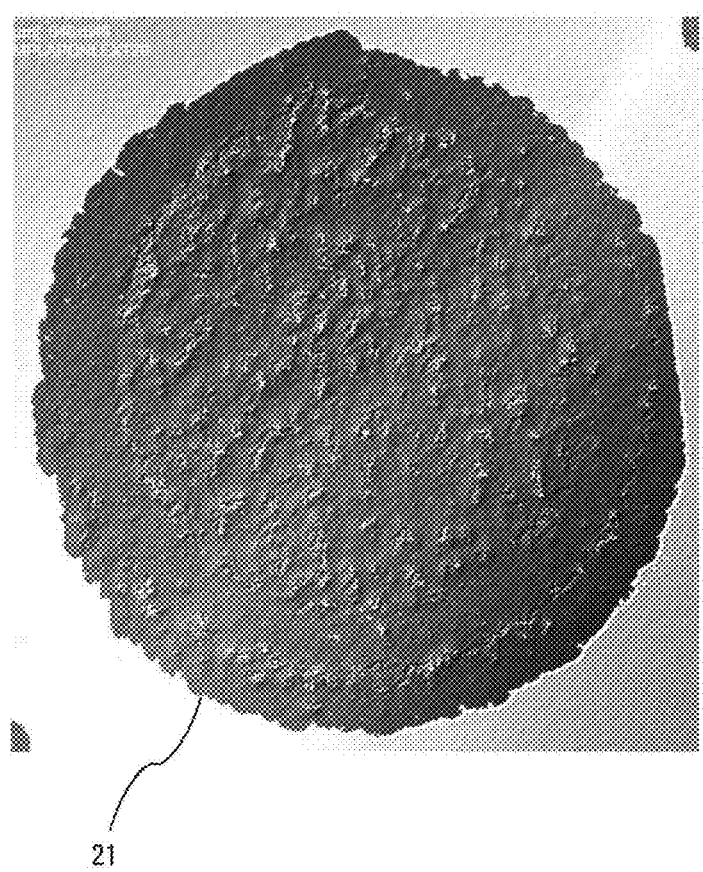
FIG. 6 is an illustrative diagram showing a specific example of an observation result of a pattern portion of a spectacle lens according to an embodiment of the present invention, which was obtained using a laser microscope.

FIG. 6 is an illustrative diagram showing a specific example of a result of observation of the pattern portion of the spectacle lens according to the present embodiment, which was obtained using a laser microscope.

As is the case with this example, if the pattern portion 20 formed through laser processing is observed using a laser microscope, the presence of laser processing marks can be recognized in the underlying surface that is exposed as a result of the thin film 13a being removed, the laser processing marks extending along scanning traces that were formed when laser beam irradiation was performed in the removal step (S104). That is, if the dots 21 constituting the pattern portion 20 have laser processing marks, it is apparent that those dots 21 were formed by partially removing the thin film 13a through laser beam irradiation.

Such a pattern portion 20 (i.e., dots 21 formed through laser processing) is formed with extremely high accuracy even if the pattern portion 20 is formed through patterning that is performed on the thin film 13a on the curved optical surface. Accordingly, the dots 21 constitute, for example, a dotted pattern that is formed with extremely high accuracy, and consequently stable quality of the spectacle lens 10 can be achieved.

Note that a specific value is described above as an example of the diameter of each dot 21, but the diameter does not necessarily need to be that value.

The diameter DD of each dot 21 can be set to 0.01 mm or more, for example, more preferably 0.05 mm or more, and further preferably 0.1 mm or more, and can be set to 5.0 mm or less, for example, preferably 2.0 mm or less, more preferably 1.0 mm or less, and further preferably 0.5 mm or less.

Also, a distance AD from the center of a dot 21 to the center of an adjacent dot 21 can be set to 0.1 mm or more, for example, preferably 0.2 mm or more, and more preferably 0.3 mm or more, and can be set to 5.0 mm or less, for example, preferably 3.0 mm or less, and more preferably 1.0 mm or less.

The ratio of the distance AD/the diameter DD can be preferably set to be greater than 1.0, more preferably 1.1 or more, and further preferably 1.2 or more, and can be preferably set to 2.0 or less, more preferably 1.8 or less, and further preferably 1.5 or less.

In any case, the dimensional variation is no greater than ±10%, preferably no greater than 6%, and more preferably no greater than 2%, in the present embodiment.

(3) Effects of Present Embodiment

According to the present embodiment, one or more of the following effects can be achieved.

(a) In the present embodiment, patterning is performed using a laser beam in the removal step (S104). Therefore, the patterning can be performed with high accuracy on the thin film 13a on the curved optical surface, and it is possible to achieve stable quality of the spectacle lens 10 that is to be manufactured. Also, the patterning can be directly performed on the thin film 13a using the laser beam, and therefore, formation and removable of a resist pattern and the like can be omitted, and processing steps for the patterning can be kept from becoming troublesome.

(b) In particular, as described in the present embodiment, a configuration in which the laser beam is emitted using a laser processing machine that supports three-dimensional control of the focal position of the laser beam is very suitable for the case where the patterning is performed on the thin film 13a on the curved optical surface.

(c) In the present embodiment, a laser beam having a wavelength that belongs to a wavelength band where the difference between the transmittance of the lens substrate 11 and the transmittance of the thin film 13a is 1% or more, preferably 3% or more, more preferably 5% or more, and further preferably 10% or more is used as the laser beam emitted in the removal step (S104). If the difference in transmittance is at least 1% as described above, when laser beam irradiation is performed, the laser beam passes through (does not damage) the lens substrate 11, and only irradiated portions of the thin film 13a can be removed due to its high absorption rate. That is, it is possible to directly perform patterning on the thin film 13a through laser beam irradiation.

(d) Also, in the present embodiment, the wavelength of the laser beam emitted in the removal step (S104) belongs to a wavelength band where there is a difference of 1% or more, preferably 3% or more, more preferably 5% or more, and further preferably 10% or more between the transmittance of the thin film 13a and the transmittance of the HC film 12, as well as between the transmittance of the thin film 13a and the transmittance of the lens substrate 11. Therefore, even if the HC film 12 is formed on the optical surface of the lens substrate 11, it is possible to directly perform patterning on the thin film 13a through laser beam irradiation.

(e) As described in the present embodiment, in the case where the optical substrate is the lens substrate 11 and the optical member is the spectacle lens 10, the spectacle lens 10 commonly has a curved optical surface, but even in this case, patterning can be performed with high accuracy, and therefore, stable quality can be achieved for the spectacle lens 10.

(f) As described in the present embodiment, a configuration in which the thin film 13a is a SnO2 film or a Cr film is very suitable for a case where the present invention is applied to the spectacle lens 10 because effects of the patterning (e.g., visibility of the predetermined pattern) can be achieved while optical transparency of the optical member being secured. However, the thin film 13a is not limited to the SnO2 film or the Cr film, and the present invention can be applied in the exact same manner to a case where the thin film 13a is another metal oxide film or another metal film so long as the metal oxide film or the metal film has an absorption property, and the exact same effects can be achieved in such a case.

(g) In the spectacle lens 10 obtained using the manufacturing method according to the present embodiment, the dots 21, which are identically-shaped portions constituting the pattern portion 20, are formed with high accuracy so as to have substantially the same shape and substantially the same dimension. That is, patterning is performed with high accuracy even if the optical surface has the curved surface shape. Therefore, stable quality can be achieved for the spectacle lens 10.

(h) In the spectacle lens 10 obtained using the manufacturing method according to the present embodiment, a dimensional variation of the dots 21 constituting the pattern portion 20 is no greater than ±10%, preferably no greater than 6%, and more preferably no greater than 2%. In the case where the optical surface has the curved surface shape, a dimensional variation that exceeds about ±10% occurs if the inkjet recording method is used, for example, but if patterning is performed by performing laser beam irradiation while performing three-dimensional control of the focal position, the dimensional variation can be reduced to be no greater than ±10%, preferably no greater than 6%, and more preferably no greater than 2%. Therefore, even if the pattern portion 20 is constituted by arranging a plurality of dots 21, the patterning can be performed with high accuracy.

In particular, in the case where the optical surface has the curved surface shape, it is highly likely that the largest dimensional variation occurs between the portion near the center of the optical surface and the portion near the peripheral edge of the optical surface, but if the largest dimensional variation is reduced to be no greater than ±10%, preferably no greater than 6%, and more preferably no greater than 2%, accuracy of the patterning performed on the thin film 13a can be increased, which is very preferable in terms of achieving stable quality of the spectacle lens 10.

(i) In the spectacle lens 10 obtained using the manufacturing method according to the present embodiment, the pattern portion 20 constitutes the dotted pattern. Uniformity of dots is very important for the dotted pattern in order to achieve effects of the dotted pattern (e.g., effect of reducing the amount of light transmission). Even in such a case, if the dimensional variation of the dots is no greater than ±10% as described in the present embodiment, the effects of the dotted pattern can be reliably achieved.

(j) In the spectacle lens 10 obtained using the manufacturing method according to the present embodiment, the pattern portion 20 has laser processing marks in the underlying surface that is exposed as a result of the thin film 13a being removed. If the pattern portion 20 has the laser processing marks, it is apparent that the pattern portion 20 was formed by partially removing the thin film 13a through laser beam irradiation. In the case where the pattern portion 20 is formed using a laser beam, patterning can be performed with high accuracy even for the thin film 13a on the curved optical surface by performing three-dimensional control of the focal position when the laser beam is emitted. This is very preferable in terms of achieving stable quality for the spectacle lens 10.

(4) Variations

Although the embodiment of the present invention is described above, the above disclosure shows an exemplary embodiment of the present invention. That is, the technical scope of the present invention is not limited to the exemplary embodiment described above, and various changes can be made without departing from the gist of the present invention.

In the above embodiment, a case where the patterning thin film 13 is formed on the HC film 12 is described as an example, but the present invention is not limited to such a case. That is, the patterning thin film 13 may be directly formed on the lens substrate 11 without the HC film 12 interposed therebetween, or the patterning thin film 13 may also be formed on the lens substrate 11 with another film of a different type from the HC film 12 interposed between the patterning thin film 13 and the lens substrate 11, for example.

Also, in the above embodiment, a case where the pattern portion 20 is a dotted pattern constituted by a plurality of dots (identically-shaped portions) 21 is described as an example, but the present invention is not limited to such a case. That is, the pattern portion 20 may be constituted by a character, a figure, or the like, rather than the dots 21. Also, the pattern portion 20 may be formed in a portion of the optical surface of the spectacle lens 10, rather than being formed over the entire optical surface. Also, the minute dots 21 may collectively constitute a character, a figure, or the like.

REFERENCE SIGNS LIST

10 Spectacle lens (optical member)
11 Lens substrate (optical substrate)
12 HC film (non-removal film)
13 Patterning thin film
13a Thin film
14 AR film
20 Pattern portion
21 Dot (identically-shaped portion)

The invention claimed is:

1. A method for manufacturing an spectacle lens, comprising:
   a film forming step of forming a thin film on an optical surface of an optical substrate, the optical surface having a curved surface shape; and
   a removal step of partially removing the thin film on the optical surface to perform patterning of the thin film that includes a pattern portion constituting a dotted pattern, wherein
   in the removal step, the thin film is removed by being irradiated with a laser beam,
   in the removal step, the laser beam is emitted using a laser processing machine that supports three-dimensional control of a focal position of the laser beam, and
   a pattern portion that is formed through the patterning in the removal step is constituted by a plurality of identically-shaped portions that are on the optical surface, and a dimensional variation of each of the identically-shaped portions is no greater than ±10%.

2. The method for manufacturing the spectacle lens according to claim 1, wherein
   a laser beam that has a wavelength that belongs to a wavelength band where a difference between a transmittance of the optical substrate and a transmittance of the thin film is 1% or more is used as the laser beam emitted in the removal step.

3. The method for manufacturing the spectacle lens according to claim 2, further comprising:
   a non-removal film forming step of forming, as a non-removal film, a film made of a material that is different from the thin film between the optical substrate and the thin film, wherein
   the wavelength of the laser beam emitted in the removal step belongs to a wavelength band where there is a difference of 1% or more between the transmittance of the thin film and a transmittance of the non-removal film, as well as between the transmittance of the thin film and the transmittance of the optical substrate.

4. The method for manufacturing the spectacle lens according to claim 1, wherein
   the thin film is a metal oxide film or a metal film that has an absorption property.

5. A spectacle lens comprising:
   an optical substrate that has an optical surface having a curved surface shape;
   a thin film that is formed on the optical surface of the optical substrate; and
   a pattern portion that is formed by partially removing the thin film, wherein
   the pattern portion is constituted by a plurality of identically-shaped portions that are on the optical surface, and in the pattern portion, a dimensional variation between an identically-shaped portion that is near the center of the optical surface and an identically-shaped portion that is near the peripheral edge of the optical surface is no greater than ±10%.

6. The spectacle lens according to claim 5, wherein
in the pattern portion, a dimensional variation of each of the plurality of identically-shaped portions is no greater than ±10%.

7. The spectacle lens according to claim 5, wherein
the pattern portion constitutes a dotted pattern, and
the identically-shaped portions constitute dots of the dotted pattern.

8. The spectacle lens according to claim 5, wherein
the pattern portion has a laser processing mark in an underlying surface that is exposed as a result of the thin film being removed.

9. The spectacle lens according to claim 5, wherein
the thin film is a metal oxide film or a metal film that has an absorption property.

10. The method for manufacturing an spectacle lens according to claim 1, wherein
pattern data regarding the pattern portion and surface data regarding the optical surface are acquired, and the focal position of the laser beam is changed so as to follow the pattern data and the surface data.

11. The method for manufacturing an spectacle lens according to claim 1, further comprising:
an anti-reflection film forming step of forming an anti-reflection film coating the thin film patterned in the removal step.

12. The spectacle lens according to claim 7, wherein
the ratio AD/DD of a distance AD from the center of a dot to the center of an adjacent dot to the diameter DD of each dot is greater than 1.0.

13. The spectacle lens according to claim 5, further comprising:
an anti-reflection film coating the thin film and the pattern portion.

14. The spectacle lens according to claim 7, wherein
the ratio AD/DD of a distance AD from the center of a dot to the center of an adjacent dot to the diameter DD of each dot is 2.0 or less.

15. The spectacle lens according to claim 7, wherein
the ratio AD/DD of a distance AD from the center of a dot to the center of an adjacent dot to the diameter DD of each dot is greater than 1.2 and is 1.5 or less.

* * * * *